US010212517B1

(12) United States Patent
Beltran et al.

(10) Patent No.: US 10,212,517 B1
(45) Date of Patent: Feb. 19, 2019

(54) HEAD-MOUNTED DISPLAY SYSTEM WITH A SURROUND SOUND SYSTEM

(71) Applicant: META COMPANY, San Mateo, CA (US)

(72) Inventors: Alan Beltran, Woodside, CA (US); Lin Cong, Palo Alto, CA (US); Eric Bokides, San Mateo, CA (US)

(73) Assignee: Meta Company, San Mateo, CA (US)

( * ) Notice: Subject to any disclaimer, the term of this patent is extended or adjusted under 35 U.S.C. 154(b) by 58 days.

(21) Appl. No.: 15/448,563

(22) Filed: Mar. 2, 2017

Related U.S. Application Data

(60) Provisional application No. 62/302,627, filed on Mar. 2, 2016.

(51) Int. Cl.
| G09G 5/00 | (2006.01) |
| H04R 5/02 | (2006.01) |
| H04S 3/00 | (2006.01) |
| G02B 27/01 | (2006.01) |

(52) U.S. Cl.
CPC ........... *H04R 5/02* (2013.01); *G02B 27/0101* (2013.01); *G02B 27/0176* (2013.01); *H04S 3/004* (2013.01); *G02B 2027/014* (2013.01); *G02B 2027/0169* (2013.01); *H04R 2499/15* (2013.01)

(58) Field of Classification Search
CPC .. H04R 5/02; H04R 2499/15; G02B 27/0176; G02B 27/0101; G02B 2027/0169; G02B 2027/014; H04S 3/004
USPC ......................................................... 345/6–8
See application file for complete search history.

(56) References Cited

U.S. PATENT DOCUMENTS

| 5,003,300 | A | 3/1991 | Wells |
| D390,552 | S | 2/1998 | Ronzani |
| D517,066 | S | 3/2006 | Travers |
| D545,960 | S | 7/2007 | Fu |
| D607,994 | S | 1/2010 | Fu |
| 8,171,934 | B1 | 5/2012 | Ho |
| D684,257 | S | 6/2013 | Clarke |
| D727,896 | S | 4/2015 | Laluque |
| D732,028 | S | 6/2015 | Kim |
| D736,771 | S | 8/2015 | West |
| D741,327 | S | 10/2015 | Reznik |
| D749,580 | S | 2/2016 | Kim |
| D752,680 | S | 3/2016 | Kim |
| D753,112 | S | 4/2016 | Fei |
| D753,113 | S | 4/2016 | Fei |
| D759,655 | S | 6/2016 | Sullivan |
| D761,257 | S | 7/2016 | Passmore |
| D764,465 | S | 8/2016 | Clement |
| D773,461 | S | 12/2016 | Jiang |

(Continued)

FOREIGN PATENT DOCUMENTS

WO    WO 2016182974 A1 * 11/2016 ........... A61B 5/7445

*Primary Examiner* — Nelson Rosario
*Assistant Examiner* — Andrew Lee
(74) *Attorney, Agent, or Firm* — Sheppard Mullin Richter & Hampton LLP

(57) ABSTRACT

Described herein is a head-mounted device including an audio system configured to provide a surround sound audio effect. The device may include one or more of a forehead assembly, a rear-head assembly, a set of speakers, a set of straps connecting the forehead assembly to the read-head assembly, and/or other components. The forehead assembly may include one or more speakers. Individual ones of the straps may include one or more speakers.

19 Claims, 17 Drawing Sheets

(56) References Cited

U.S. PATENT DOCUMENTS

| | | |
|---|---|---|
| D776,110 S | 1/2017 | Baldassi |
| D776,111 S | 1/2017 | Baldassi |
| D780,751 S | 3/2017 | Park |
| D780,752 S | 3/2017 | Park |
| D781,288 S | 3/2017 | Park |
| D783,019 S | 4/2017 | Letbetter |
| D785,619 S | 5/2017 | Su |
| 9,638,921 B2 | 5/2017 | Miller |
| D791,125 S | 7/2017 | Sullivan |
| D791,126 S | 7/2017 | Sullivan |
| D791,129 S | 7/2017 | Sullivan |
| 9,716,932 B2 | 7/2017 | Miller |
| D799,480 S | 10/2017 | Flanders |
| D805,072 S | 12/2017 | Seki |
| D805,073 S | 12/2017 | Morris |
| D807,882 S | 1/2018 | Gribetz |
| D810,743 S | 2/2018 | Yee |
| D812,612 S | 3/2018 | Gribetz |
| 2013/0272546 A1* | 10/2013 | Besgen, Sr. ............. H04R 1/025 381/120 |
| 2015/0023521 A1* | 1/2015 | Jones ..................... H04R 3/005 381/80 |
| 2016/0353062 A1* | 12/2016 | Ono ........................ H04N 7/142 |
| 2017/0131553 A1* | 5/2017 | Pletenetskyy ...... G02B 27/0176 |
| 2017/0235143 A1 | 8/2017 | Chi |
| 2017/0243602 A1* | 8/2017 | Yang ................... G10L 21/0264 |
| 2017/0364144 A1* | 12/2017 | Petrov ..................... G06F 3/012 |

\* cited by examiner

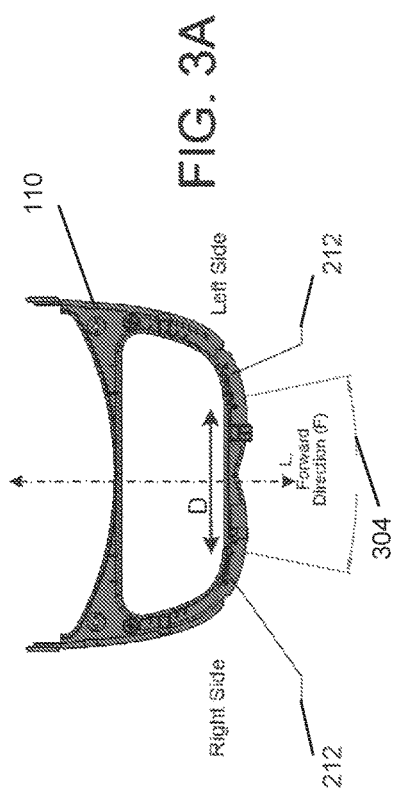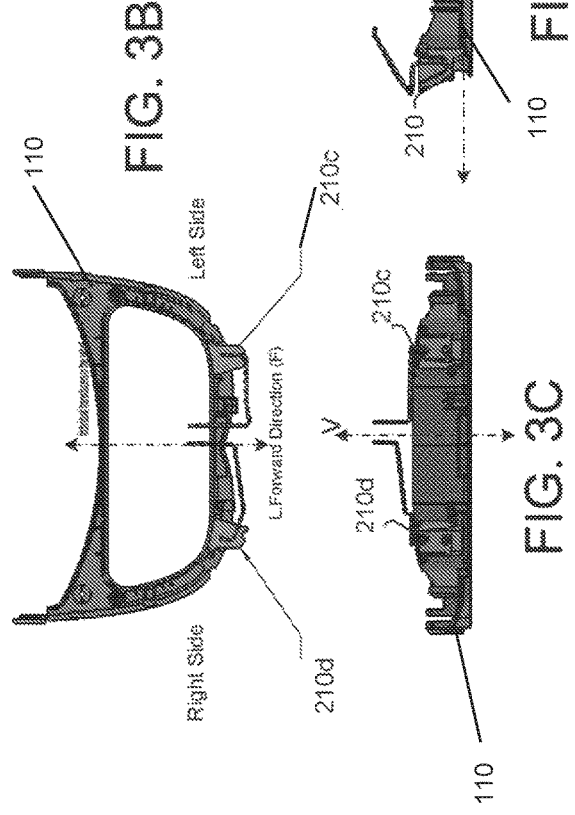

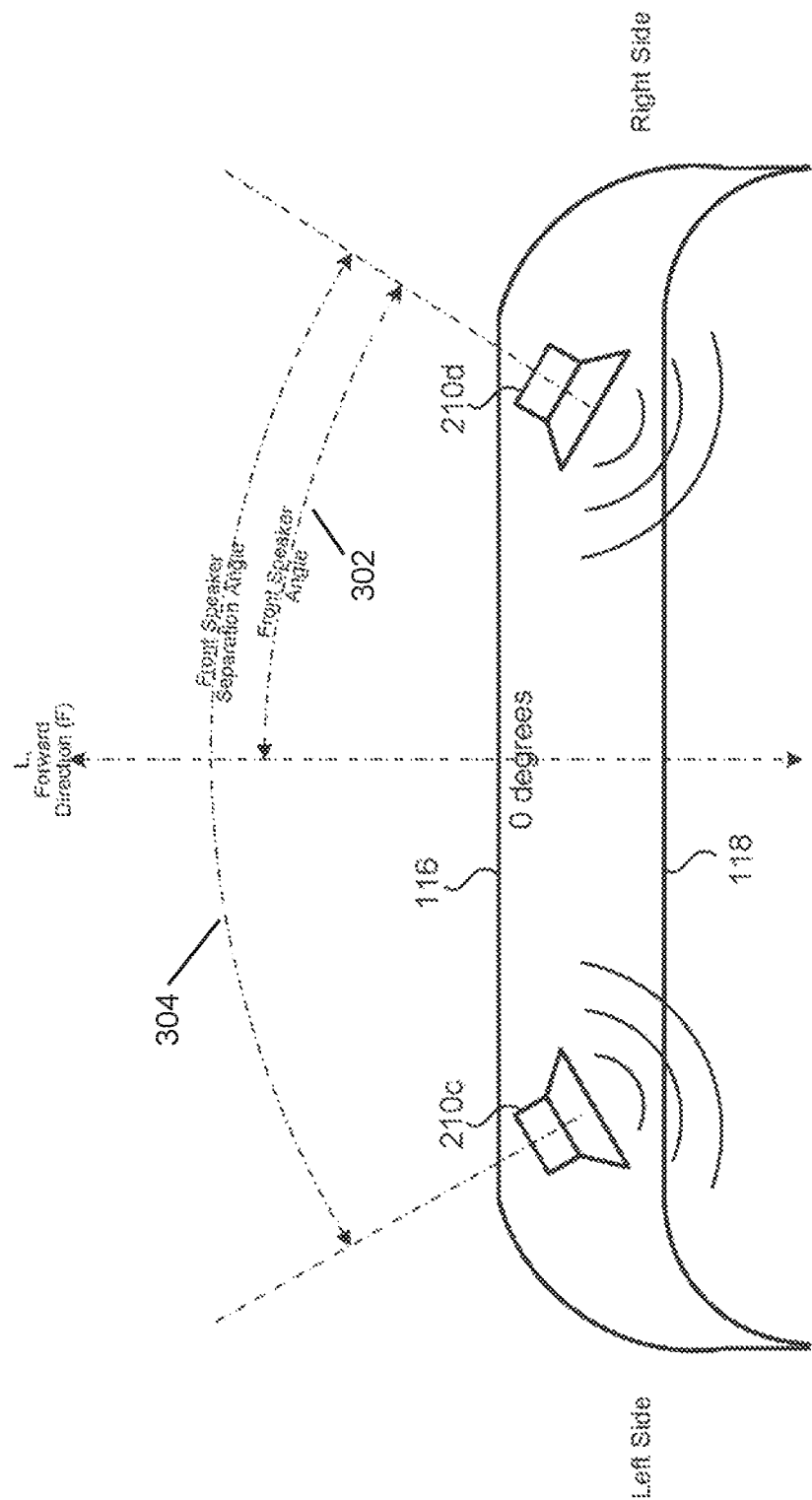

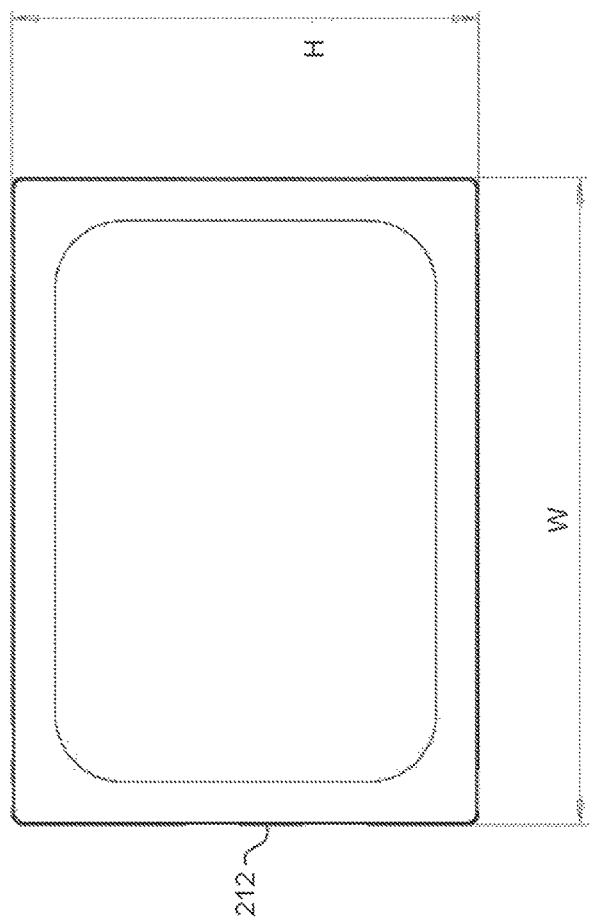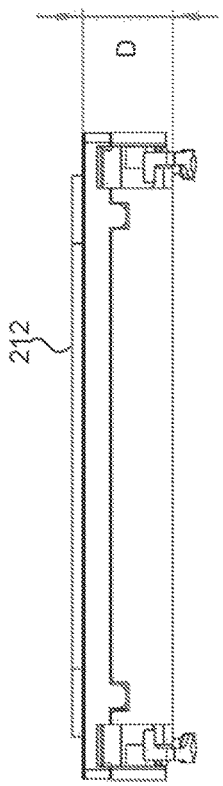

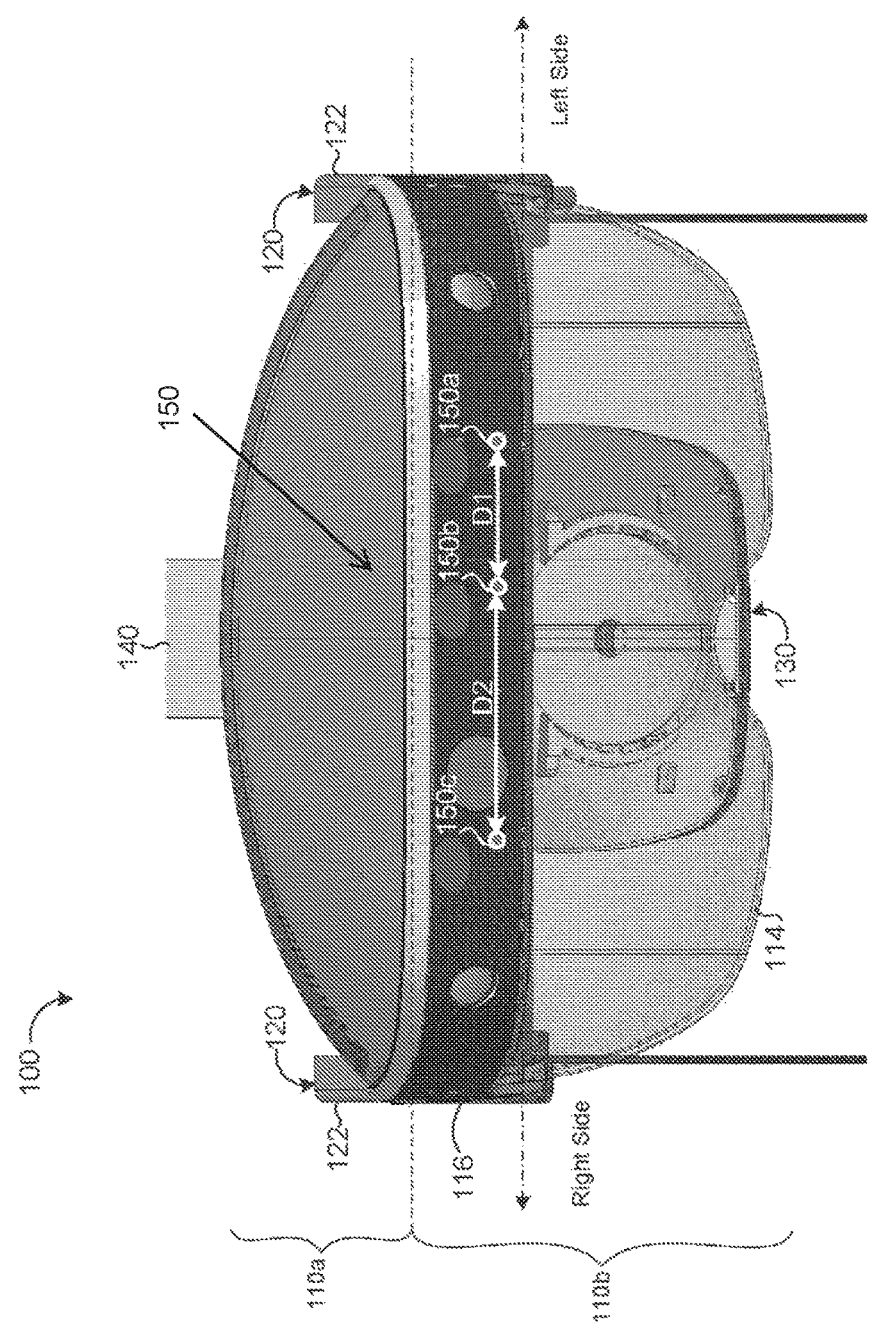

HEAD-MOUNTED DISPLAY SYSTEM WITH A SURROUND SOUND SYSTEM

FIELD OF THE INVENTION

This disclosure relates to a head-mounted display system used for displaying virtual reality and augmented reality that includes a surround sound system.

BACKGROUND OF THE INVENTION

In recent years, digital technology has trickled into every aspect of our analog life. Most recently, there is a surge in digital technology to replace or enhance our visual experiences. Head-mounted displays (HMDs) have been around for years; however, as computers get more powerful, the visual effects provided by the computers are getting more spectacular, resulting in a resurgence of HMDs.

An HMD is a display device worn on the head of a user or as part of a helmet worn by the user. The HMD may incorporate an opaque display optic positioned in front of one (monocular HMD) or each eye (binocular HMD) of the user. Alternatively, an optical HMD is a wearable device, also worn on the head of user that incorporates transparent optics that have the capability of relaying projected images to the viewer, while allowing the viewer to see the exterior environment. One example of a HMD includes a small display optic (e.g., data glasses or a visor) in front of one or both eyes. The HMD may be an optical head-mounted display (OHMD), which is configured to reflect projecting images on an optical element (e.g., a visor or lens) and allow the user to see through the optical element. Usually, HMDs have one or two small optical elements with lenses and semi-transparent mirrors embedded within data glasses or a visor. A display for generating images forming virtual content may include one or more of a liquid crystal display (LCD), liquid crystal on silicon (LCoS), an organic light-emitting diode (OLED), and/or other display. In some implementations, the display may be a laser-based light source. A laser-based light source may comprise one or more of a laser, an RGB laser, and/or other laser-based light sources. In some implementations, a laser-based light source may be coupled with one or more directional control devices, such as a micro-electrical-mechanical system (MEMS), a beam steering device, and/or other devices. In some examples, the display includes multiple micro-displays to increase the total resolution and field of view, therefore providing a better experience to the user. HMDs are used in many applications including military, governmental, and civilian/commercial (e.g., movies, video gaming, sports, etc.), among others.

HMDs may be used to replace our visual experience (e.g., via Virtual Reality (VR)) or enhance our visual experience (e.g., via Augmented Reality (AR)). VR, sometimes referred to as immersive multimedia or computer-simulated reality, replicates an environment that simulates a physical presence in places in the real world or an imagined world. VR allows the user to interact with that world. Moreover, VR may artificially create sensory experiences relating to the virtually created world, which may include one or more of sight, touch, audio, and smell. AR is a live direct or indirect view of a physical, real-world environment that includes augmented or supplemented elements generated by a computer having sensory inputs. The sensory inputs may include one or more of a sound, a video, graphics, or position data. AR modifies the view of reality by using a user device, more specifically an application executing on the user device. Furthermore, AR functions by enhancing a user's perception of reality, which is different from virtual reality that replaces the real world with a simulated one. AR applications provide the user with a real-time experience in relation and in context with environmental elements around the user. Recently, and due to the advancement in user device application technologies, AR applications allow a user to interact with his/her environment and objects within the environment and manipulate the AR associated with the environment.

SUMMARY

One or more aspects of the disclosure relate a head-mounted device. The head-mounted device may include one or more of a forehead assembly, a first side strap, a second side strap, a set of speakers, and/or other components. The forehead assembly may define a forward direction. The forehead assembly may comprise one or more of a forehead body, a first speaker, a second speaker, and/or other components. The forehead body include one or more of a first side portion, a second side portion, and/or other portions. Individual ones of the first side portion, the second side portion and/or other portions may further include an upper portion, a lower portion, and/or other portions. The first speaker may be positioned on the lower portion of the first side portion of the forehead body. The second speaker may be positioned on the lower portion of the second side portion of the forehead body. The first side strap may be connected to the first side portion of the forehead body. The first side strap may include a first volume for receiving one or more speakers. By way of non-limiting illustration, a third speaker may be housed in the first volume. The second side strap may be connected to the second side portion of the forehead body. The second side strap may include a second volume for receiving one or more speakers. By way of non-limiting illustration, a fourth speaker may be housed in the second volume.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

FIG. 3A is a top view of an exemplary forehead body supporting first and second transducers.

FIG. 3B is a top view of an exemplary forehead body supporting first and second front speakers.

FIG. 3C is a front view of an exemplary forehead body supporting first and second front speakers.

FIG. 3D is a side view of an exemplary forehead body supporting the front speakers.

FIG. 3E is a top view of an exemplary forehead body supporting the front speaker outputting audio.

FIG. 4A is a top view of an exemplary transducer.

FIG. 4B is a side view of the transducer of FIG. 4A.

FIG. 6A is a front view of an exemplary microphone system supported by a forehead body of an HMD.

Like reference symbols in the various drawings indicate like elements.

DETAILED DESCRIPTION

Figure 1A:
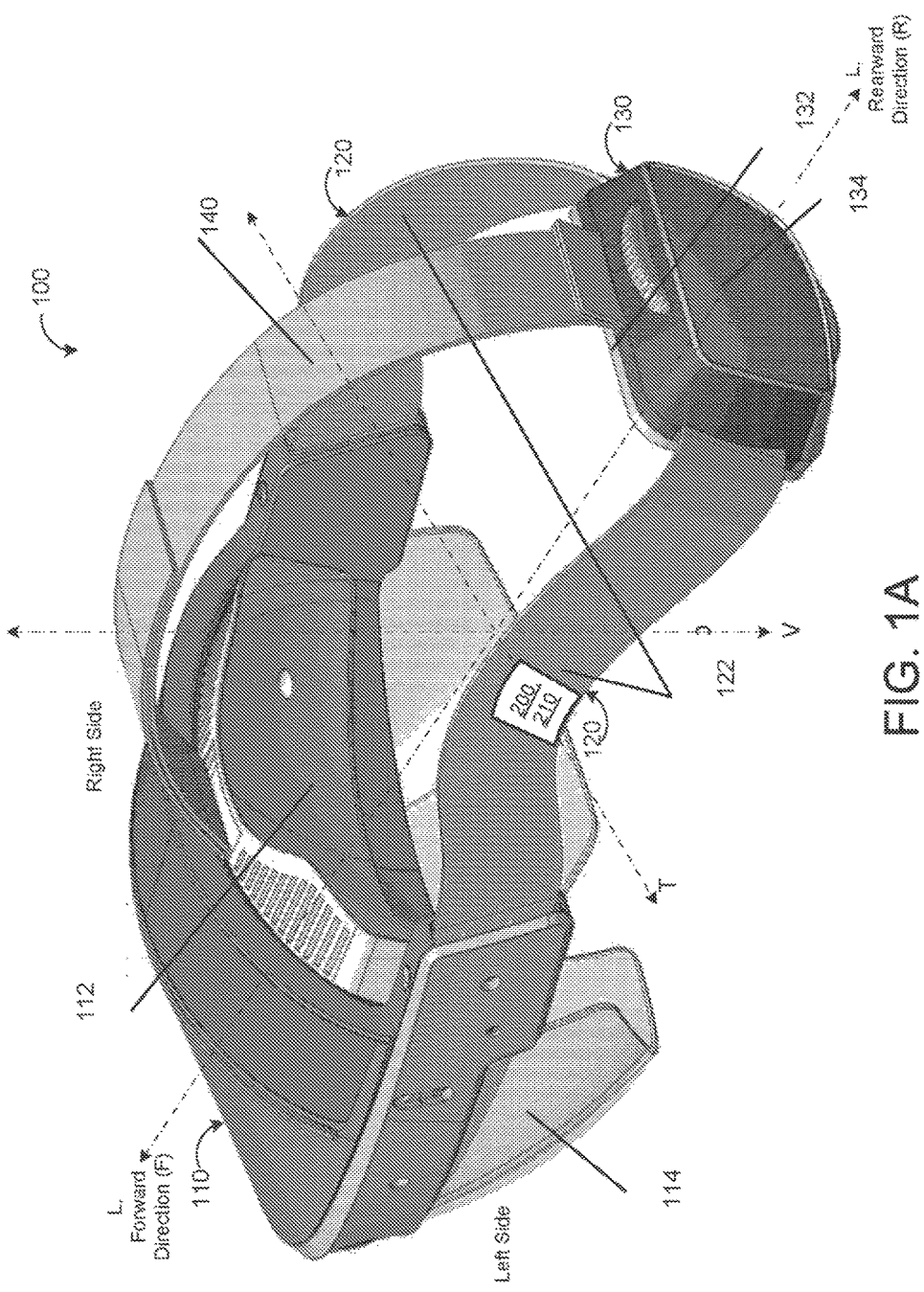
FIG. 1A is a rear perspective view of an exemplary HMD with an audio system.

Head-mounted displays (HMD) have gained great popularity in recent years, specifically Wearable Augmented Reality Eye Wear (WAREW). Due to the increased computing powers of processing hardware, HMDs can now provide a user with an improved visual experience, i.e., improved Virtual Reality (VR) or Augmented Reality (AR) experience. Therefore, since a user wears these HMDs on the head or as part of a helmet, it is desirable to design an HMD that fits the user's head and is comfortable for short or extended wear. In addition, it is also desirable to provide an HMD that gives the user the best AR and VR experience with respect to audio and/or imaging.

Current HMDs, specifically WAREW, have functions and features that may allow users to see three-dimensional (3D) visual content, and in some examples, allow the user to listen to audio associated with the visual content, while an array of sensors interface with both the external world and the user. The HMDs may include complex electronic architecture that have several sensors, circuit boards and components, imaging technology, ad hoc optics, and/or other elements. In some examples, an HMD includes an optical engine configured to generate an image and project the image onto an optical element (e.g., a lens or visor) of the HMD and provide audio associated with the image. The position of the optical engine within the HMD may be important, specifically because it should be in a consistent and reliable location with respect to the user's pupil, such that the light rays from the optical engine enter the aperture of the eye (the pupil) within tolerances of the optical engine. The designated location of the pupil with respect to the optical engine and associated tolerances may be referred to as the "eye-box." The eye-box may comprise a volume that the pupil falls within for the optical engine to perform as designed so that the user may have a reliable VR or AR experience. Therefore, no matter what the anatomical shape of the facial and cranial parts a user possesses, a design and/or position of the optical engine should ensure constant geometric relationship between the pupil and the display and be in communication with an audio system that outputs audio associated with the displayed images. The HMD may include one or more speakers, in communication with the optical engine that allow the user to listen to audio associated with the visual content. Therefore, it may also be desirable to design an HMD that is not only comfortable when being worn, but also provides the best audio and visual experience to the user.

Referring to FIGS. 1A-1F, an HMD 100 may include a built-in audio system 200 that may facilitate the creation of surround sound for playback, entertainment, and/or voice communication using speakers 210, e.g., loudspeakers, and/or other audio reproduction devices. The audio system 200 may create high fidelity (HiFi) sound. The audio system 200 may allow a user to experience an immersive audio experience, resulting in an immersive AR experience. Moreover, the audio system 200 may allow a user to hear noise from the environment, be it noisy or not so noisy, when listening to audio from the audio system 200.

Figure 1B:
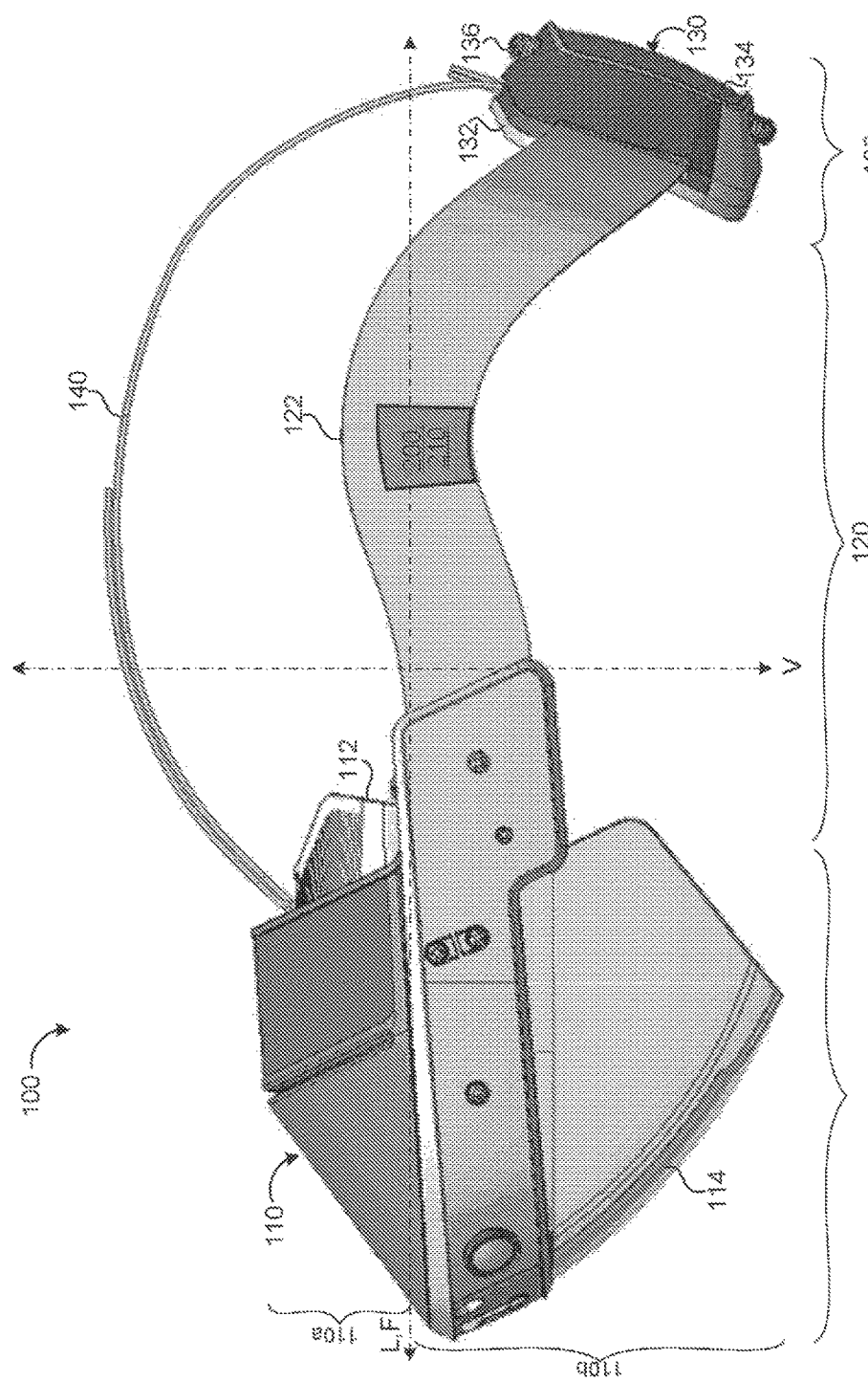
FIG. 1B is a side view of an exemplary HMD with an audio system.

In some implementations, in FIG. 1B (see, also, FIG. 1E), HMD 100 may include one or more of a forehead assembly 111, respective side portions 120 (e.g., left side and/or right side), a rear-head assembly 130, a top strap 140, and/or other components.

The HMD 100 may be configured to define one or more reference lines. The one or more reference lines may include one or more of a longitudinal axis "L," a transverse axis "T," a vertical axis "V," and/or other reference lines. The longitudinal axis L may extend from the forehead assembly 111 to the rear-head assembly 130 in a forward direction. The transverse axis T may extend along or across the side portions 120. The vertical axis V may extend from the top strap 140 to a bottom portion of the HMD 100.

In some implementations, forehead assembly 111 may include one or more of forehead body 110, a forehead support 112, a forehead pad, a visor 114, one or more electronic components (not shown), and/or other components. The one or more electronic components may include one or more of an optical engine, one or more processors, and/or other electronic components. The one or more electronic components may be housed within the forehead body 110. The optical engine may be configured to provide an image or a partial image reflected or displayed on the visor 114 providing a display. The forehead support 112 may provide an interface between the forehead body 110 and the user's forehead. The forehead support 112 may include one or more materials configured to provide support and/or cushion to the user's forehead. By way of non-limiting illustration, the forehead support 112 may include a memory foam material and/or other materials.

In some implementations, forehead assembly 111 may include the same or similar assembly as described in "WIDE FIELD OF VIEW HEAD MOUNTED APPARATUSES, METHODS AND SYSTEMS," U.S. application Ser. No. 14/945,372, filed Nov. 18, 2015, which is hereby incorporated by reference in its entirety.

The side-head portions 120 may include left and/or right side straps 122 or pads that releasably connect the forehead assembly 111 to the rear-head assembly 130. The rear-head assembly 130 may include one or more of a buckle pad 132, a buckle 134, a tightening mechanism 136, and/or other components. The buckle 134 may rest on a user's lower back head portion. The rear-head assembly 130 includes the buckle pad 132 (e.g., a foam pad) on a side of the rear-head assembly 130 that may be configured to be in contact with the user's head. The buckle pad 132 may be configured to provide cushion and/or comfort between the buckle 134 and the user's head. The top strap 140 may be configured to further connect the forehead assembly 111 to the rear-head assembly 130. The top strap 140 may be positioned between the side straps 122 (e.g., left and right side straps).

Figure 1C:
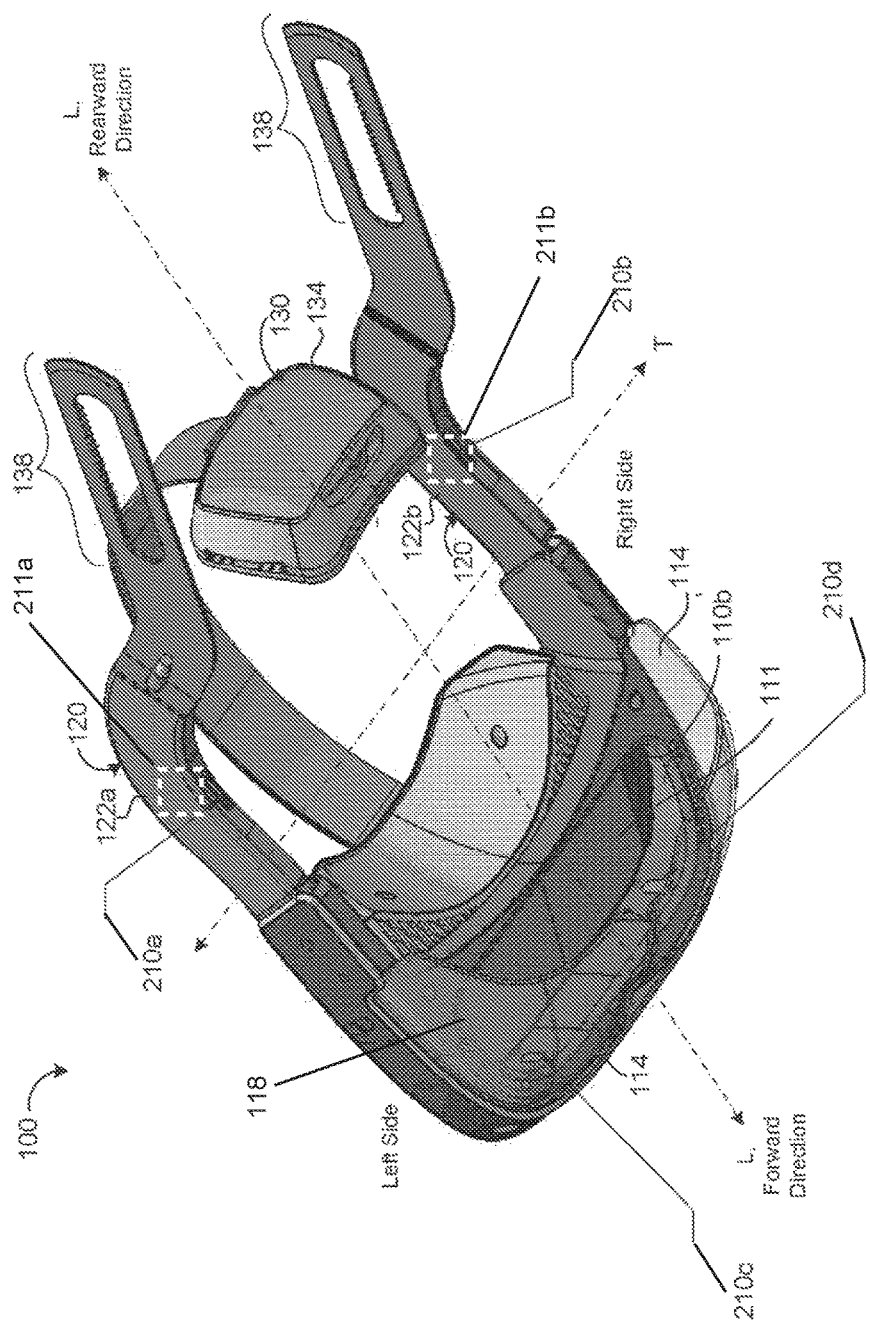
FIG. 1C is an elevated rear perspective view of an exemplary HMD with an audio system.
Figure 1D:
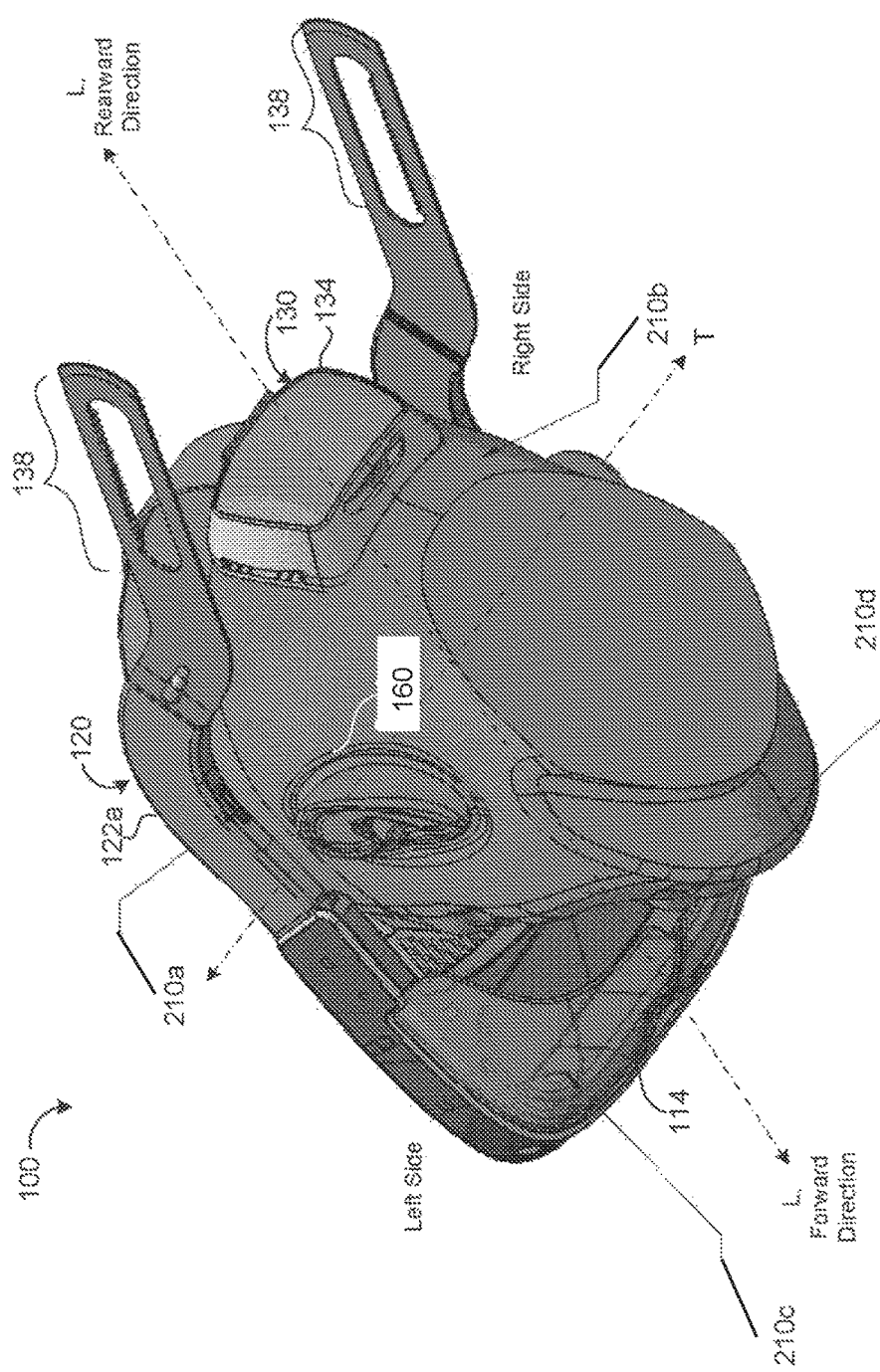
FIG. 1D is an elevated rear perspective view of an exemplary HMD with an audio system worn by a user.
Figure 1E:
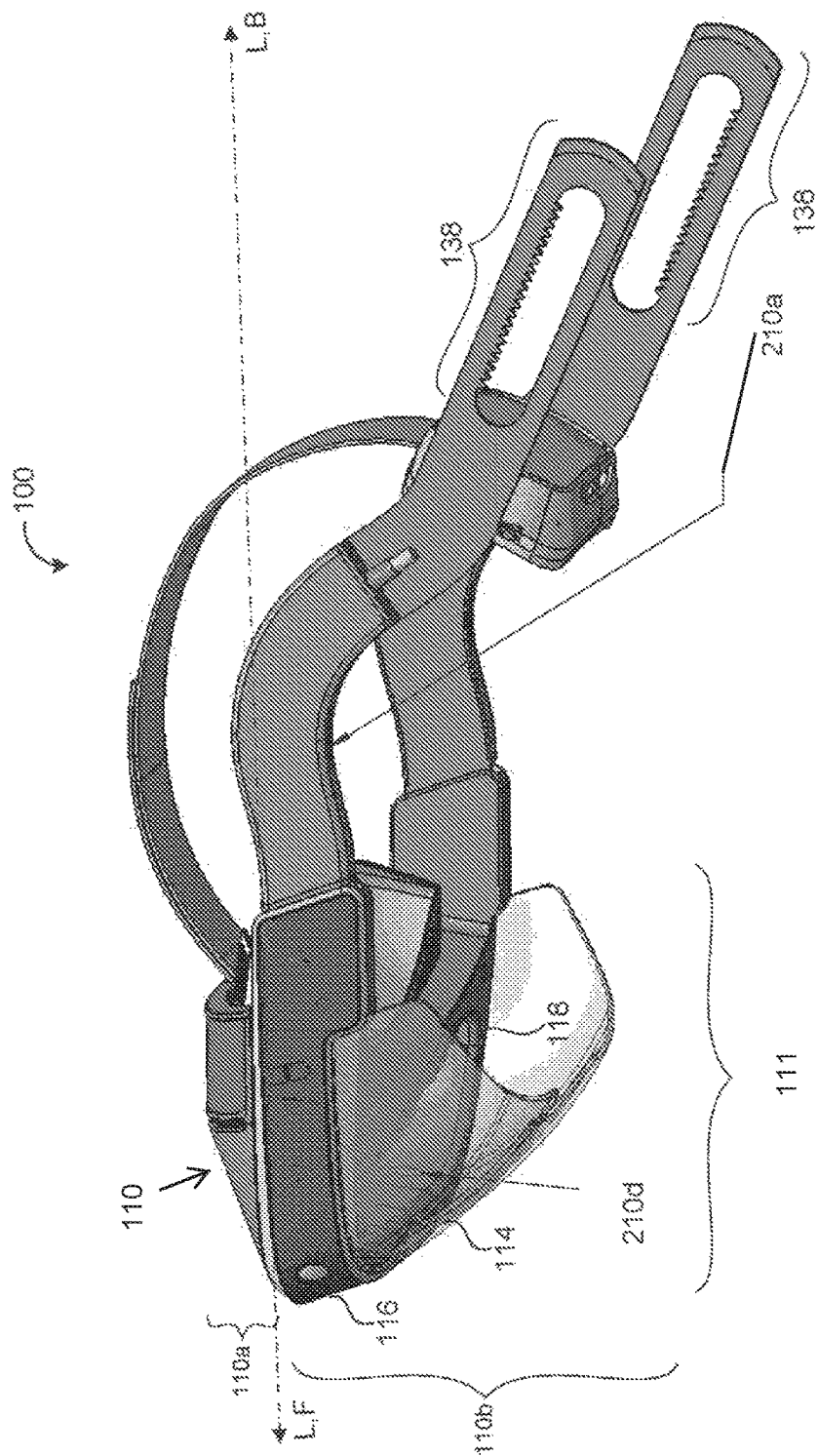
FIG. 1E is a side perspective view of an exemplary HMD with an audio system.

In some implementations, as shown at least in FIG. 1E, the forehead body 110 may include one or more of an upper portion 110a, a lower portion 110b, and/or other portions. Individual ones of the right side portion and the left side portion of the forehead body 110 may further be defined the upper portion 110a and the lower portion 110b.

The lower portion 110b may include an outer enclosure 116 having an exterior surface facing the forward direction F. The lower portion 110b may further include an inner enclosure 118 having an exterior surface facing a rearward direction R opposite the forward direction F. The exterior surface of the inner enclosure 118 may face towards a user's face when the HMD 100 is positioned on a user's head. In some implementations, the inner enclosure 118 may have a shape that may be complimentary to (e.g., the same as or similar to) the outer enclosure 116. The visor 114 may be positioned between the inner enclosure 116 and the outer enclosure 118. The visor 114 may extend at an acute angle extending from the inner enclosure 116 and the outer enclosure 118 towards the face of the user (e.g., along the rearward direction R opposite the forward direction F). The visor 114 may extend at an acute angle with respect to the longitudinal line L towards the rearward direction R of the longitudinal line L.

The layout of the respective side portions 120 and/or rear-head assembly 130 may be configured to support the weight of the HMD 100. As shown in FIG. 1C, the side portions 120 may include one or both of a first strap 122a and/or a second strap 122b. The first strap 122a and/or second strap 122b may individually curve around respective ears of a user. In some implementations, the curvature of first and second straps 122a and 122b may depend on position and/or size of the ears relative to an eye, in a way that the straps may not touch the ears of at least 95% of the population across groups. The rear-head assembly 130 may include one or more of buckle pad 132 to support the head of a user (e.g., the inion) buckle 134, a tightening mechanism 136, and/or other components. The tightening mechanism 136 may be configured to allow the user to adjust the tightness of the straps 122, 140.

The straps 122 may individually have an arcuate shape. The straps 122 may curve around a user's ears. By way of non-limiting illustration, as shown at least in FIG. 1D, the straps 122 may be configured to curve over ear area 160. Ear area 160 may be an area where more than 95% of the population's ears may be positioned. The curvature of the straps 122 may be designed in a way that joins in the inion of 95% of the users. The buckle size and pad may form to ensure that the known variability of inion location relative to the eyes is respected throughout the population. The advantage of the side straps 122 and the buckle 134 form may be that the unit may not tilt with tightening, hence preserving eye-box delivery in users.

In some implementations, individual straps 122, 140 may include individual tightening portions, such as a tightening portion 138 shown in FIGS. 1C-1F. The tightening portion 138 may be configured to engage with the tightening mechanism 136 to tighten and/or loosen the straps 122, 140. As shown, the tightening portion 138 may include a corrugated shape and/or other features. The tightening mechanism 136 may include a complementary corrugated shape and/or other features. The tightening mechanism 136 may be configured to facilitate tightening and/or loosening of the straps 122, 140 using the cooperative engagement of the tightening portion 130 in the straps and a complementary corrugated shape in the tightening mechanism 136. By way of non-limiting illustration, tightening mechanism 136 may work as a ratchet to tighten the straps in increments determined by the size and/or shape of ridges and/or groves in the corrugations.

Figure 5A:
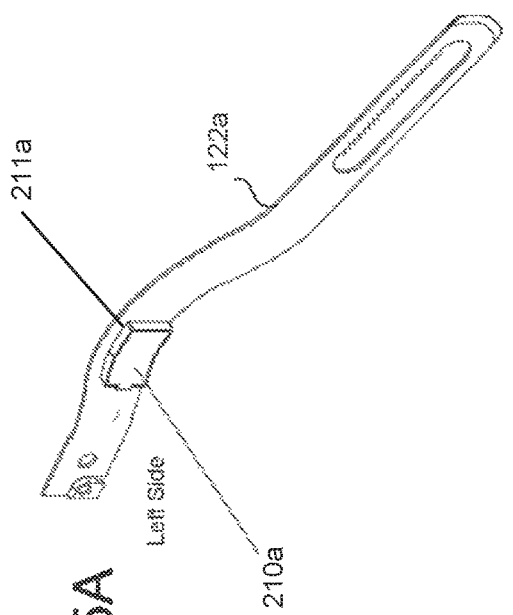
FIG. 5A is a perspective view of the left side strap supporting a first speaker.
Figure 5B:
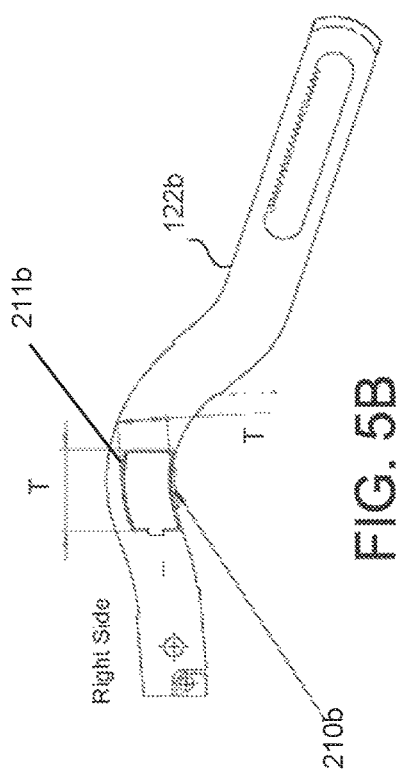
FIG. 5B is a perspective view of the right side strap supporting a second speaker.

In some implementations, in FIG. 1, HMD 100 may include audio system 200. The audio system 200 may include one or more of one or more speakers 210 (e.g., one, two, three, four, or more speakers), one or more physical processors (not shown in FIG. 1), and/or other components. The one or more speakers 210 may be positioned within the HMD 100 so that the one or more speakers 210 may provide the user with an improved audio experience. In some implementations, as shown at least in FIGS. 1C, 1D and 1F, the one or more speakers 210 may include one or more of a first speaker 210a, a second speaker 210b and/or other speakers. In some implementations, first speaker 210a and/or other speakers may be located in and housed by the first strap 122a. In some implementations, second speaker 210b and/or other speakers may be located in and housed by second strap 122b. By way of non-limiting illustration as shown in FIG. 1C and FIGS. 5A-B, the first strap 122a may include a first internal volume 211a (shown by dashed lines in FIG. 1C) configured to house the first speaker 210a. The second strap 122b may include a second internal volume 211b (shown by dashed lines in FIG. 1C) configured to house the second speaker 210b. The individual volumes may be provided, for example, as one or more of a pocket, a pouch, and/or other enclosure that may receive and/or house the respective speakers (see, e.g., FIGS. 5A-B).

Individual ones of the first speaker 210a, the second speakers 210b, and/or other speakers may be located on respective straps to sit above and/or around a user's ear. For example, the first speaker 210a (i.e., left side speaker) may be housed in the first strap 122a and positioned above a user's left ear; while the second speaker 210b (i.e., right side speaker) may be housed in the right side strap 122b and positioned above a user's right ear. One or more of the first speaker 210a, the second speakers 210b, and/or other speakers may be positioned in such a way to output audio in a direction towards a user's ear canal entrance.

Figure 1F:
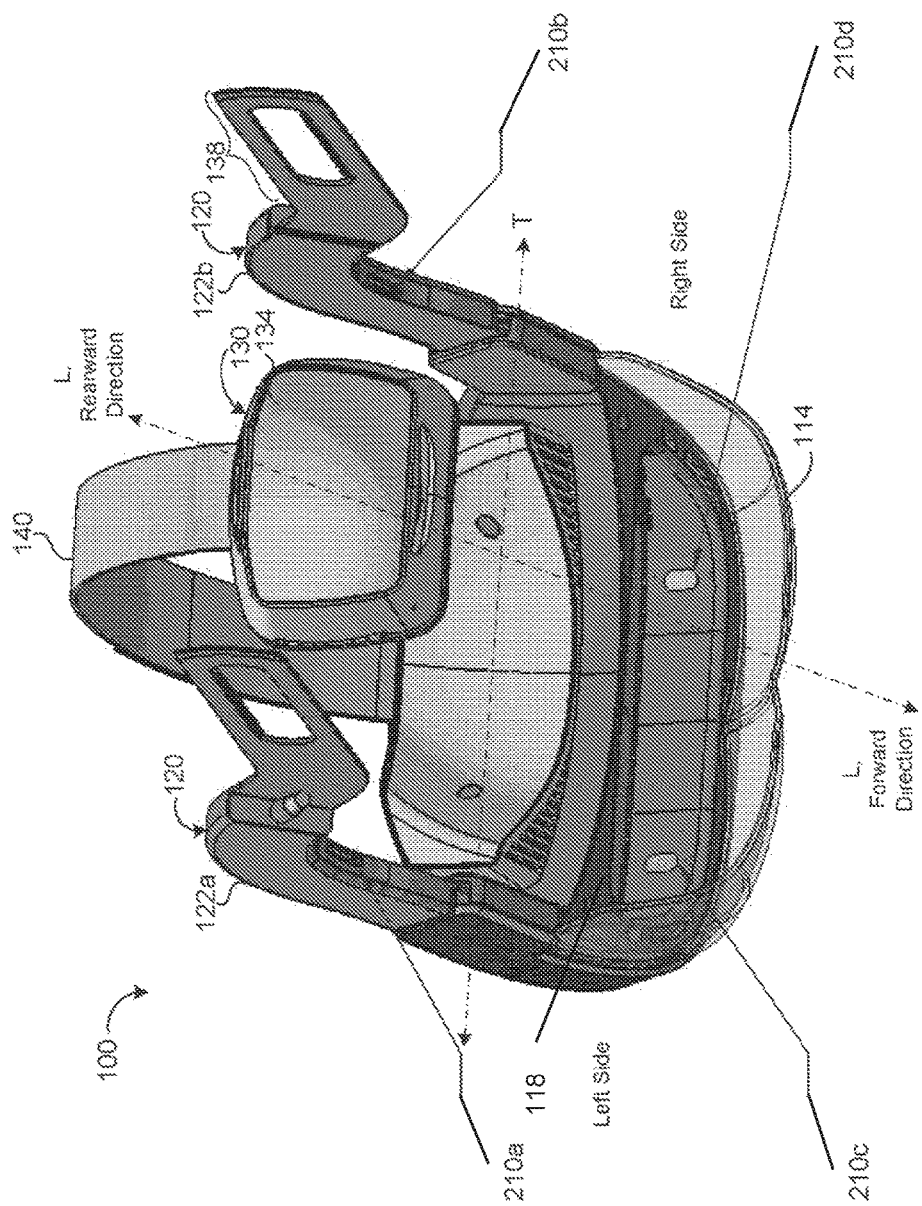
FIG. 1F is a rear perspective view of an exemplary HMD with an audio system.
Figure 2B:
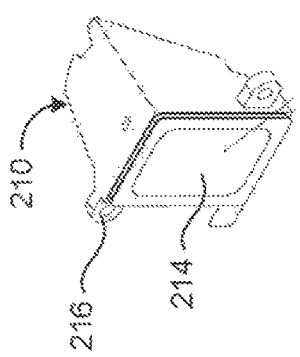
FIG. 2B is a side perspective view of the front speaker of FIG. 2A.
Figure 2E:
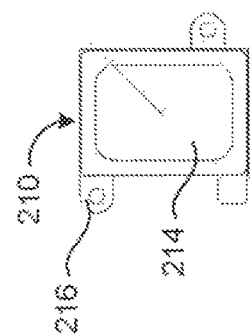
FIG. 2E is a front view of the front speaker of FIG. 2A.
Figure 2D:
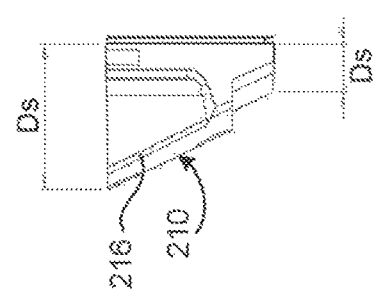
FIG. 2D is a side view of the front speaker of FIG. 2A.
Figure 2A:
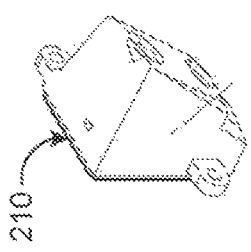
FIG. 2A is a side perspective view of an exemplary front speaker of the audio system.
Figure 2C:
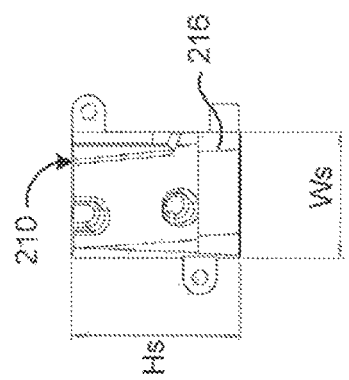
FIG. 2C is a rear view of the front speaker of FIG. 2A.

In some implementations, continuing reference to at least FIG. 1F, the audio system 200 may include one or more of a third speaker 210c, a fourth speaker 210d, and/or other speakers. In some implementations, the third speaker 210c may be positioned in a left side or portion of the inner enclosure 118. In some implementations, the fourth speaker 210d may be positioned in a right side or portion of the inner enclosure 118. As shown, the inner enclosure 118 may house at least two speakers (e.g., third and fourth speakers 210c, 210d). However, in some implementations, the inner enclosure 118 may be configured to house one speaker, two speakers, and/or other quantity of speakers.

In some implementations, the audio system 200 (including one or more of first speaker 210a, second speaker 210b, third speaker 210c, fourth speaker 210d, and/or other components) may be configured to create a surround sound effect. Surround sound may include a technique used for enhancing the sound reproduction quality of an audio source with multiple audio channels from the speakers. Surround sound may provide sound from a 360-degree radius in a horizontal plane (two dimensional) as opposed to sound originating from a listener's forward arc (e.g., a sound outputted from a television monitor). For example, the audio system 200 may create a surround sound effect, such as, but not limited to 5.1-surround sound and/or other surround sound effects. A 5.1-surround sound effect may include a six-channel surround sound system. The 5.1 surround sound may be used to simulate a home theatre experience by using five full bandwidth channels and one low-frequency effect channel (i.e., the point one). Some examples of 5.1-surround may be, but not limited to, Dolby 5.1, Dolby Digital, Dolby Pro Logic II, DTS, SDDS. 5.1 systems may use one or more of a front left channel, a front right channel, a center channel, two side channels (e.g., side right and side left), a subwoofer, and/or other channels. The audio system 200 may create a Dolby 5.1-surround. In some implementations, the front left channel may be provided to the third speaker 210c, the front right channel may be provided to the fourth speaker 210d, the side left channel may be provided to the first speaker 210a, and the side right channel may be provided to the second speaker 210b. Moreover, the center channel may be mixed with the two front speakers 210c, 210d (i.e., third and fourth speakers). The first speaker 210a may be a front speaker by virtue of positioning on the lower portion 110b of a side portion (e.g., left side portion) of the forehead body 110. The second speaker 210b may be a front speaker by virtue of positioning on the lower portion 110b of a second side portion (e.g., right side portion) of the forehead body 110. The bass channel may be mixed using different speakers.

Figure 7:
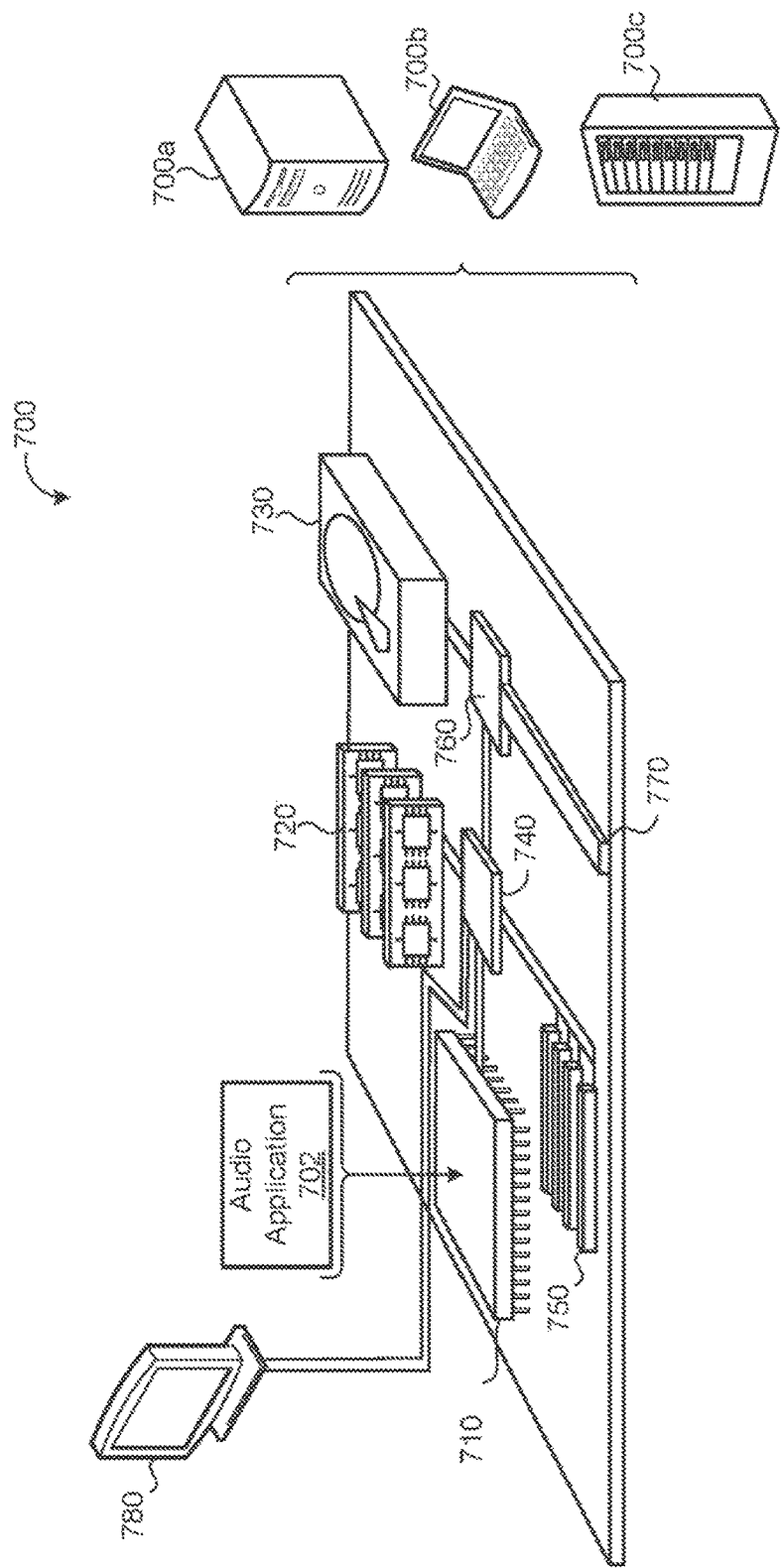
FIG. 7 is a schematic view of an exemplary computing device executing one or more systems and/or methods described herein.

In some implementations, the audio system 200 may be in communication with one or more of the optical engine, one or more physical processors, and/or other electronic components (e.g., one or more components with system 700 in FIG. 7 and/or one or more electronic components housed within forehead body 110). For example, individual speakers of one or more speakers 210 may be in communication with the optical engine and/or other electronic components. In some implementations, one or more processors may execute a software audio application 702 (FIG. 7) that may enhance the audio outputted from the one or more speakers 210. For example, a computer program component of one or more processors executing audio application 702 may be configured to assign individual speakers of one or more speakers 210 a channel and communicate audio signals to the individual speakers to simulate a surround effect (e.g., 5.1-channel sound), as presented herein.

By way of non-limiting illustration, one or more physical processors housed within forehead body 110 may be in communication with audio system 200. The one or more physical processors may be configured by machine-readable instructions. One or more computer-program components of the machine-readable instructions may be configured to perform one or more of assigning individual speakers of one or more speakers 210 to an individual channel, effectuating communication of individual audio signals to individual ones of the speakers based on the assigned channel (e.g., one or more of the first speaker 210a, the second speaker 210b, the third speaker 210c, the fourth speaker 210d, and/or other speakers), and/or other operations.

Referring back to at least FIGS. 1C, 1D, and 1F, the visor 114 may define an enclosure for front speakers (e.g., one or more of the third speaker 210c, the fourth speaker 210d, and/or other speakers). Individual ones of the third speaker 210c, the fourth speaker 210d, and/or other speakers may be configured to outputs audio towards the face of a user. One or more speakers that may be located within and/or otherwise held by the forehead body 110 (e.g., at least the third and fourth speakers 210c, 210d) may be surrounded by the upper portion 110a of the forehead body 110 (that includes the optical engine) and the visor 114. This configuration creates a guide that directs the sound waves towards the user's ears. One or more speakers (e.g., at least the third and fourth speakers 210c, 210d) that may be surrounded by the upper portion 110a and visor 114 may separate the user from the background noise, so that the user may have a better audio experience (i.e., listen to audio produced by the audio system 200 without influence from the environment).

In some implementations, one both of the third speaker 210c and/or fourth speaker 210d may be larger than one or both of the first speaker 210a and/or the second speaker 210b. By way of non-limiting illustration, one both of the third speaker 210c and/or fourth speaker 210d may be provide a higher decibel output than one or both of the first speaker 210a and/or the second speaker 210b. In this configuration, the audio system 200 may provide more bass (i.e., describes tones of low frequency such as those falling within a bass frequency range). A base frequency range may include a range of 20-256 Hz, and/or other frequencies. A high frequency range may include frequencies of 256 Hz or higher. In some implementations, a high frequency output may be about 300 Hz. In some implementations, a high frequency output may be about 700 Hz. In some implementations, the first speaker 210a, the second speaker 210b, the third speaker 210c, the fourth speaker 210d, and/or other speakers may be the same size and/or type of speaker.

In some implementations, audio system 200 may allow a user to select an output type of speakers based on the user's preferences. For example, the user may select a mono option that only uses one of the speakers (e.g., one of four speakers). Another option may be stereo option, which uses two speakers (e.g., two of four speakers). Yet another option may be surround sound, which uses a set of at least four speakers in the audio sound system 200. Individual ones of the options may be used with different applications. For example, Mono may be used when the user is using the HMD 100 as a voice communication device (e.g., a telephone).

FIGS. 2A-2E illustrate an example of an individual one of one or more speakers 210 positioned in the forehead body 110 of the HMD 100. In particular, the example shown may refer to one or both of the third speaker 210c and/or fourth speaker 210d. The individual speaker 110 may include one or more of a front port 214 for outputting audio, a bracket 216 configured to house the individual speaker 210 within a volume of the forehead body 110, and/or other components. The bracket 216 may have a width Ws and a height Hs. The bracket 216 may have an angled back portion, which may result in the bracket 216 having a variable depth Ds.

Figure 3F:
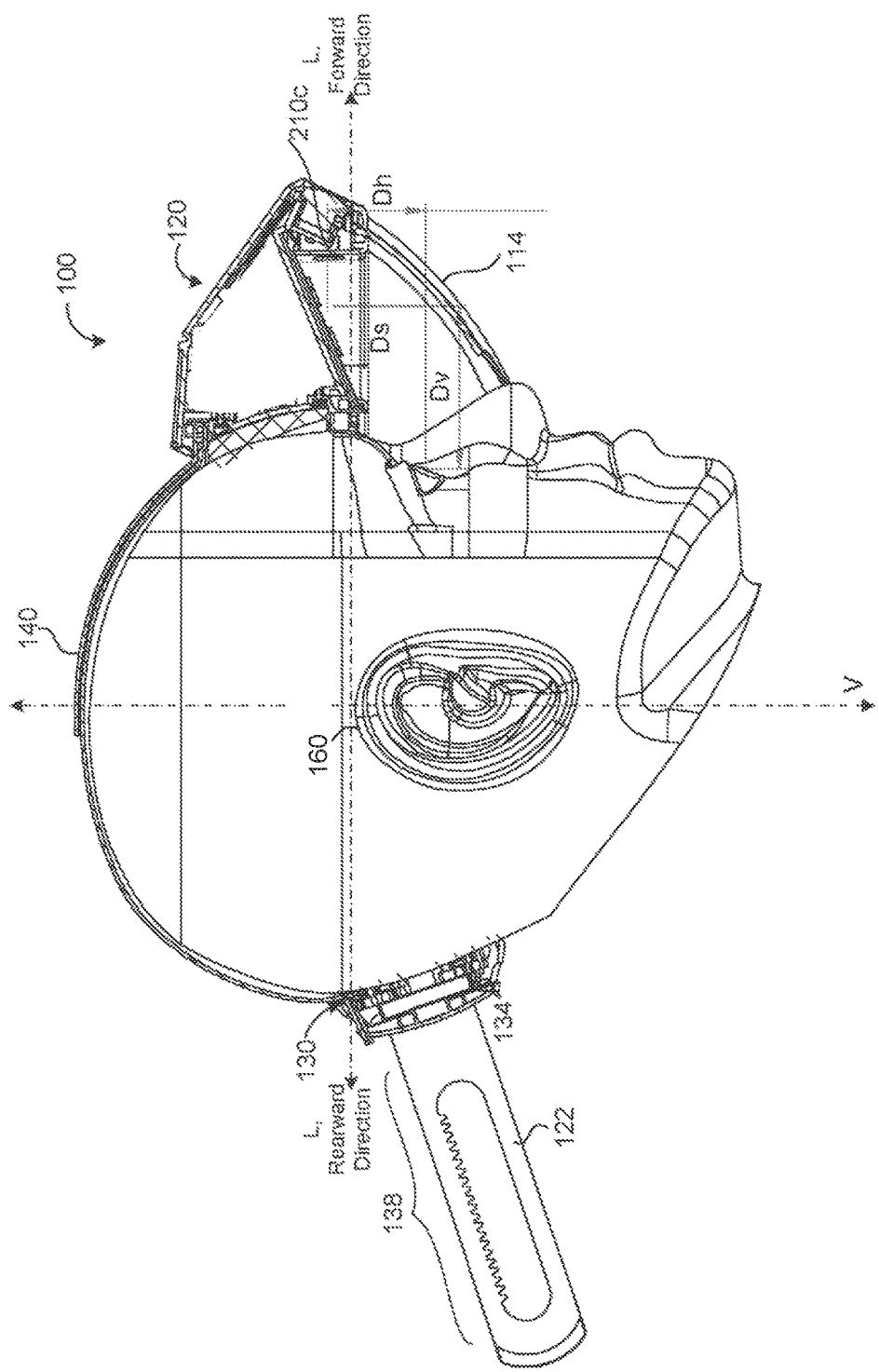
FIG. 3F is a side view of an exemplary forehead body supporting the front speaker and a visor.

FIGS. 3A-3G show the audio system 200 within the forehead body 110 of the HMD 100. FIG. 3A includes a set of transducers 212 (shown in FIGS. 4A and 4B). The set of transducers 212 may include two transducers and/or other quantity of transducers. Individual transducers in the set of transducers 212 may be associated with a respective speaker (e.g., individual ones of the third speaker 210c, the fourth speaker 210d, and/or other speakers). Individual transducers in the set of transducers 212 may be configured to convert electrical signals into sound that may be outputted from a respective speaker.

In some implementations, a distance D (FIG. 3A) may separate the transducers 212. The third speaker 210c and the fourth speaker 210d may be separated by the same distance D. In some implementations, distance D may be in the range of 6 to 12 centimeters and/or other ranges. The distance D may be measured from a center of a port of the third speaker 210c to a center of a port of the fourth speaker 210d. The front speakers (e.g., one or more of the third speaker 210c, the fourth speaker 210d, and/or other speakers) may be symmetrical about the user's center plane.

In some implementations, the third speaker 210c may be located in the front left side of the forehead body 110 facing the user's face. In some implementations, as shown at least in FIG. 3E, individual ones of the third speaker 210c and/or fourth speaker 210d may be positioned at an individual front speaker angle 302 off the center of the longitudinal axis L. The front speaker angle may be about 11 degrees (yaw) and/or other angles. A front speaker separation angle 304 between the third and fourth speakers 210c, 210d may be two times the front speaker angle 302, since the third and fourth speakers 210c, 210d may be symmetrical about the longitudinal axis L. For example, the front speaker separation angle 304 may be about 22 degrees and/or other angle. This may mean the third speaker 210c and the fourth speaker 210d may be facing one another at about 22 degrees. Other values for the front speaker angle 302 are as also contemplated.

Referring to FIG. 3F, in some examples, the front speakers (e.g., one or more of third speaker 210c, fourth speaker 210d, and/or other speakers) may be at a distance Ds away from a user's eye. The third speaker 210c (left side) may be at a distance Ds from the user's left eye, and the fourth speaker 210d (right side) may be at a distance Ds from the user's right eye. In some implementations, the front speakers are positioned at a distance Dh above the user's eye (i.e., center of the eye). For example, the third speaker 210c may be positioned at a distance Dh above the center of the left eye, and the fourth speaker 210d may be positioned at the distance Dh above the center of the right eye.

Figure 3G:
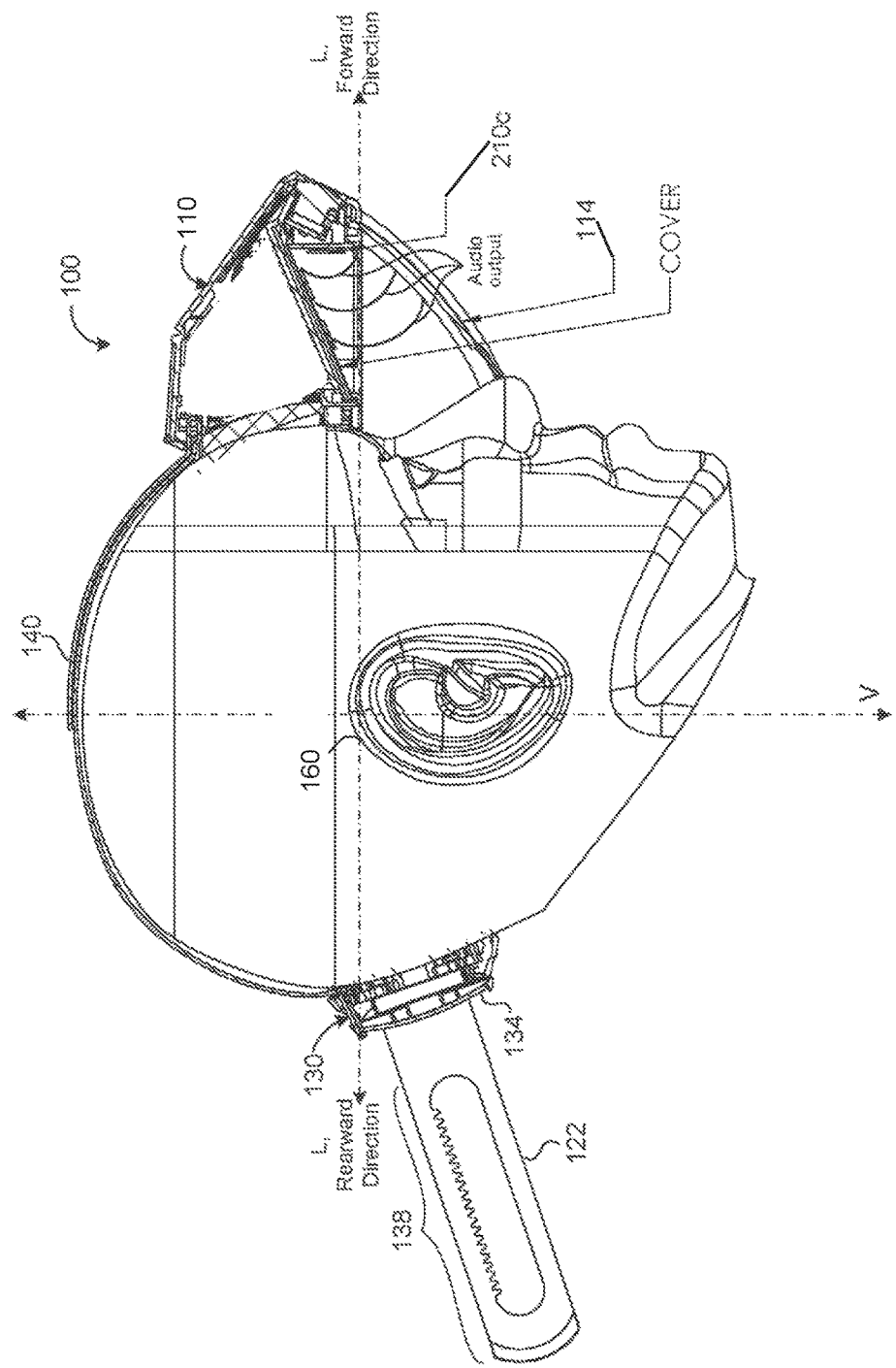
FIG. 3G is a side view of an exemplary forehead body supporting the front speaker and a visor acting as a guide to guide outputted sound signals from the front speakers.

As shown in FIG. 3G, the first speaker 210a, second speaker 210b, and/or other speakers may be positioned in such a way as to output audio that may be guided to the user's ear by an enclosure within the visor 114, e.g., acting as a guide. In some implementations, sound reflections may occur when the audio output may be traveling to the ears, which might change the frequency response. In some implementations, Dynamic range compression/automatic gain control (DRC/AGC) may be used in combination with multi-channel equalization.

Referring to FIGS. 4A and 4B, in some implementations, individual transducers in the set of transducers 212 may have one or more of a width W, a height H, and a depth D.

Figure 5C:
FIG. 5C is top view of the strap supporting the speaker.

FIGS. 5A-5C show different views of the first speaker 210a and second speaker 210b positioned within the first and second straps 122a, 122b respectively. FIG. 5A shows the first speaker 210a housed by the first side strap 122a at a portion of the first strap 122a having an arcuate shape. FIG. 5B shows the second speaker 210b housed by the second side strap 122b at a portion of the second strap 122b having an arcuate shape.

Figure 5D:
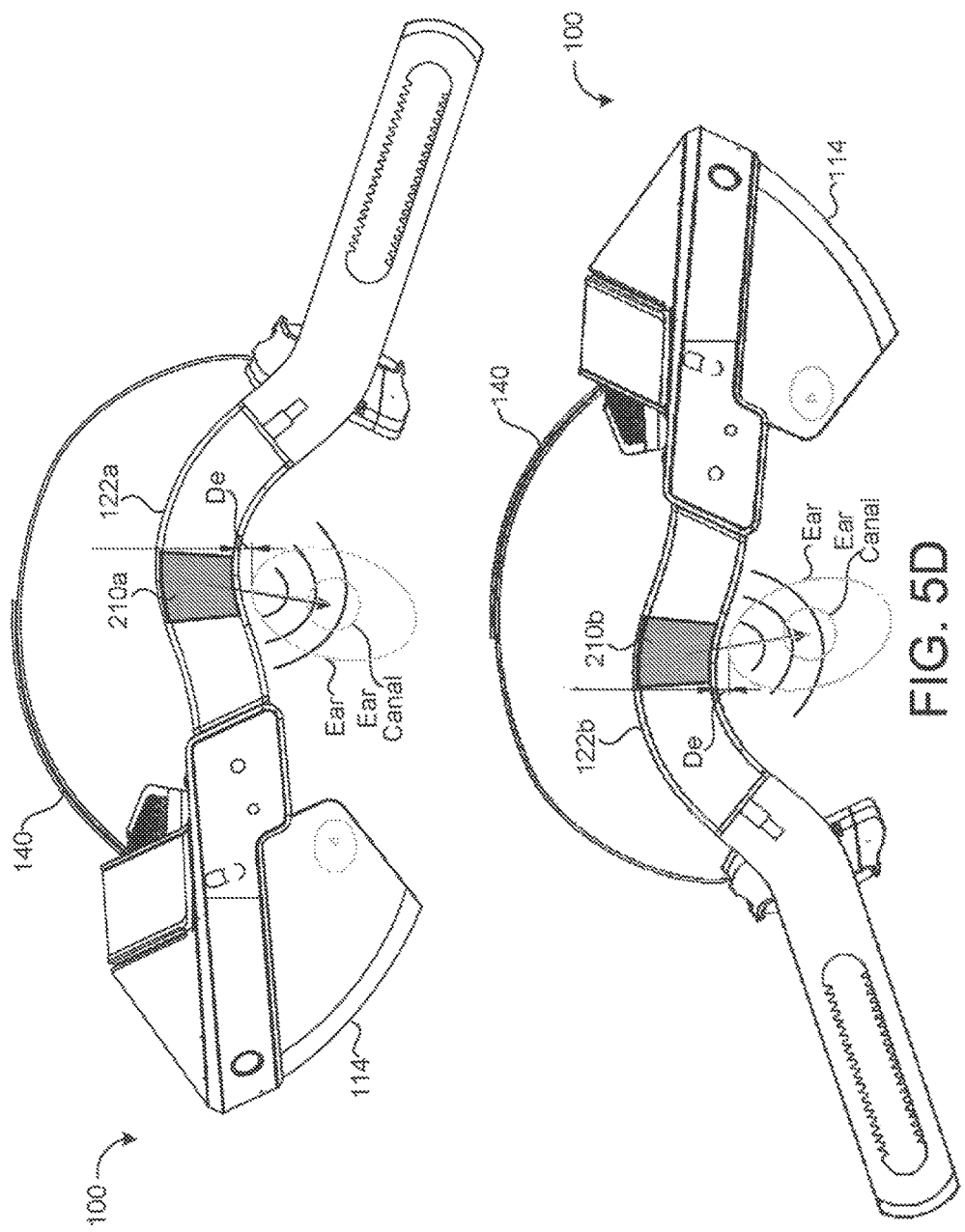
FIG. 5D is a side view of the HMD outputting sound signals from the side speaker.

In some implementations, as shown in FIG. 5D, the first speaker 210a may be located above a user's left ear inside the first strap 122a. The speaker output from the first speaker 210 may be directed so that it outputs sound over the tip of the left ear. Similarly, the second speaker 210b may be located above a user's right ear inside the second strap 122b having the speaker output positioned so that it outputs sound over the tip of the right ear. In some implementations, individual ones of the first speaker 210a, second speaker 210b, and/or other speakers may be positioned at a distance De (e.g., measured from the edge of the speaker) to the tip of the respective ear. In this configuration, audio output may be directed towards the ear canal entrance of individual ones of the users ears. In some implementations, De may be in the range of 3-7 millimeters and/or other ranges.

In some implementations, a strap distance may separate the first speaker 210a from the second speaker 210b. The strap distance may measure from the center of the first speaker 210a to the center of the second speaker 210b. first speaker 210a and the second speaker 210b may be symmetric about the user's center plane. The first speaker 210a and the second speaker 210b may be integrated into a flexible strap (e.g., respective ones of the first strap 122a and the second strap 122b) such that the strap may follow the contour of the user's head. Such a design ensures that the output of the first speaker 210a and the second speaker 210b may be as close to the user's ear as possible.

Referring to FIG. 6A, in some implementations, the HMD 100 may include a microphone system 150. The microphone system 150 may include one or more microphones including one or more of a first microphone 150a, a second microphone 150b, a third microphone 150c, and/or other microphones. The microphone system 150 may allow the user to communicate via voice. In some implementations, the outer enclosure 116 may be configured to house the microphone system 150 in such a way that the voice projected from a user's mouth may reach one or more microphones included in the microphone system 150. The microphone system 150 may include one or more transducers (not shown). Individual transducers may be associated with individual microphone included in the microphone system 150. The individual transducer may be configured to convert sound into an electrical signal before transmitting the signal to a destination.

Figure 6B:
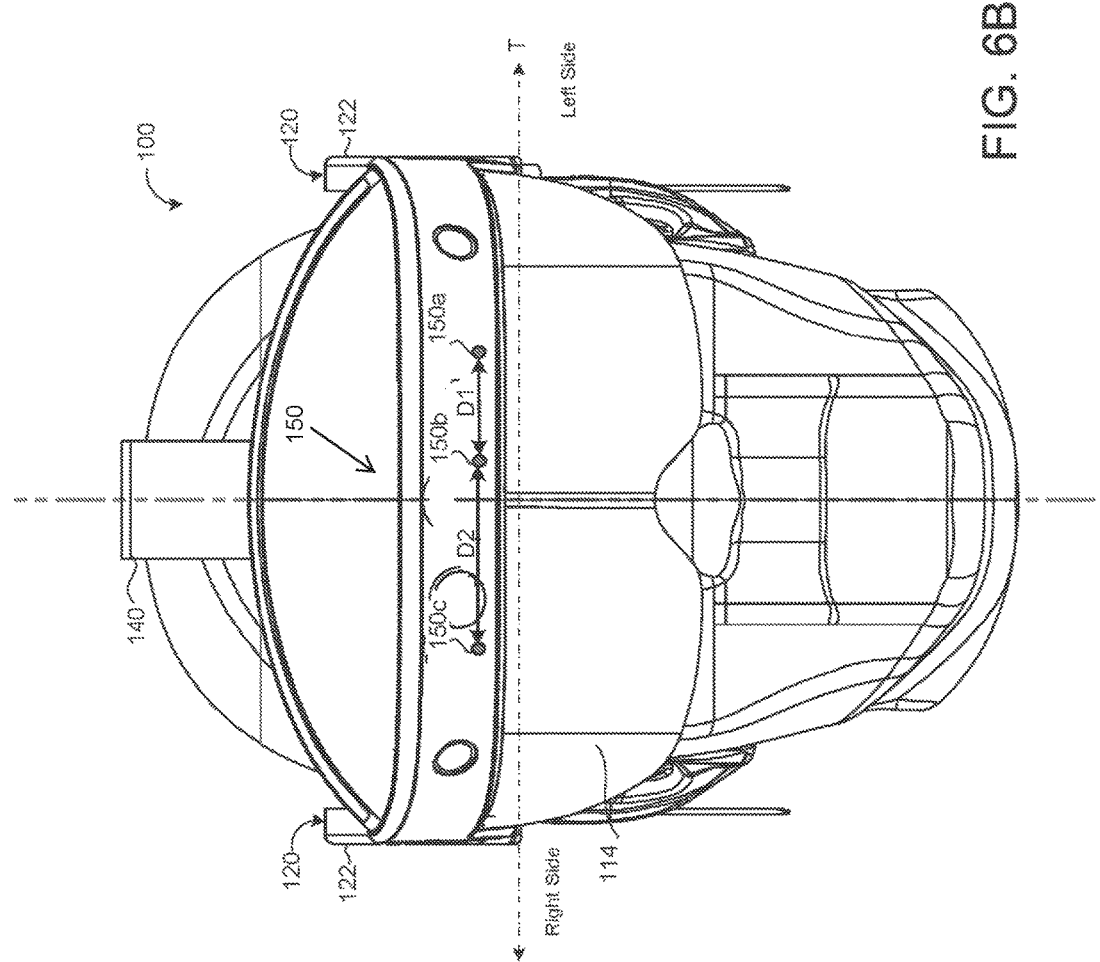
FIG. 6B is a front view of an exemplary microphone system supported by a forehead body of an HMD.

As shown in FIGS. 6A and 6B, the microphones 150a, 150b, and/or 150c may be aligned horizontally. In some implementations, the microphones 150a, 150b, and/or 150c may have a first distance D1 separating the first microphone 150a and the second microphone 150b, and a second distance D2 separating the second microphone 150b and the third microphone 150c. In some implementations, the first distance D1 may be about three centimeters and/or other distances. In some implementations, the second distance D2 may be about five centimeters and/or other distances. The microphones 150a, 150b, and/or 150c may be arranged in one or more other arrangements separated by one or more other distances.

FIG. 7 is schematic view of an example computing system 700 that may be used to implement one or more implementations of the systems and/or methods presented herein (e.g., including software audio application 702 that may be used to enhance the sound quality). The computing system 700 may be intended to represent various forms of digital computers, such as one or more of laptops, desktops, workstations, personal digital assistants, servers, blade servers, mainframes, and/or other computers. The components shown here, their connections, relationships, and/or functions, are meant to be exemplary, and are not meant to limit implementations of the disclosure described herein.

The computing system 700 may include one or more of a processor 710, a memory 720, a storage device 730, a high-speed interface/controller 740, high-speed expansion ports 750, a low speed interface/controller 760, a low speed bus 770, a storage device 730, and/or other components Individual ones of the components 710, 720, 730, 740, 750, and/or 760 may be interconnected using various busses, and may be mounted on a common motherboard and/or in other manners. The processor 710 may be configured to process instructions for execution within the computing system 700. By way of non-limiting illustration, the processor 710 may be configured by machine-readable instructions stored in the memory 720 and/or on the storage device 730 to display graphical information for a graphical user interface (GUI) on an external input/output device, such as display 780. Display 780 may be coupled to high speed interface 740. In some implementations, multiple processors and/or multiple buses may be used, as appropriate, along with multiple memories and types of memory. In some implementations, multiple computing systems 700 may be connected, with individual devices providing portions of the necessary operations (e.g., as a server bank, a group of blade servers, a multi-processor system, and/or other components).

The memory 720 may be configured to electronically store information non-transitorily within the computing system 700. The memory 720 may be one or more of a computer-readable medium, a volatile memory unit(s), non-volatile memory unit(s), and/or other memory. The non-transitory memory 720 may include physical devices used to store programs (e.g., sequences of instructions) or data (e.g., program state information) on a temporary or permanent basis for use by the computing system 700. Examples of non-volatile memory include, but are not limited to, one or more of flash memory and read-only memory (ROM), programmable read-only memory (PROM), erasable programmable read-only memory (EPROM), electronically erasable programmable read-only memory (EEPROM) (e.g., typically used for firmware, such as boot programs), and/or other memory. Examples of volatile memory may include, but are not limited to, one or more of random access memory (RAM), dynamic random access memory (DRAM), static random access memory (SRAM), phase change memory (PCM), and/or other memory.

The storage device 730 may be configured to provide mass storage for the computing system 700. In some implementations, the storage device 730 may be a computer-readable medium. In some implementations, the storage device 730 may be one or more of a floppy disk device, a hard disk device, an optical disk device, a tape device, a flash memory, other solid state memory devices, an array of devices, and/or other devices. In some implementations, storage device 730 may include devices in a storage area network. In some implementations, a computer program product may be tangibly embodied in an information carrier. The computer program product may include instructions that, when executed by a processor, may perform one or more operations of one or more methods, such as those described herein. The information carrier may be a computer- or machine-readable medium, such as the memory 720, the storage device 730, or memory on processor 710, and/or other devices.

The high speed controller 740 may be configured to manage bandwidth-intensive operations for the computing system 700. The low speed controller 760 may be configured to manage lower bandwidth-intensive operations. Such allocation of duties is exemplary. In some implementations, the high-speed controller 740 may be coupled to one or more of the memory 720, the display 780 (e.g., through a graphics processor or accelerator), the high-speed expansion ports 750, and/or other components which may accept various expansion cards (not shown). In some implementations, the low-speed controller 760 may be coupled to one or both of the storage device 730 and/or the low-speed expansion port 770. The low-speed expansion port 770, which may include various communication ports (e.g., USB, Bluetooth, Ethernet, wireless Ethernet), may be coupled to one or more of one or more input/output devices such as a keyboard, a pointing device, a scanner, a networking device such as a switch or router, e.g., through a network adapter, and/or other components.

The computing system 700 may be implemented in a number of different forms, as shown in the figure. For example, it may be implemented as one or more of a server 700a, multiple times in a group of such servers 700a, as a laptop computer 700b, as part of a rack server system 700c, and/or other devices.

Various implementations of the systems and techniques described here may be realized in digital electronic and/or optical circuitry, integrated circuitry, specially designed ASICs (application specific integrated circuits), computer hardware, firmware, software, and/or combinations thereof. These various implementations may include implementation in one or more computer programs that may be executable and/or interpretable on a programmable system including at least one programmable processor coupled to receive data and instructions from, and to transmit data and instructions to, one or more of a storage system, at least one input device, at least one output device, and/or other devices.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" refer to one or more of a computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described herein may be implemented as one or more computer program products, i.e., one or more components or modules of computer program instructions encoded on a computer readable medium for execution by, or to control the operation of, a processing apparatus. The computer readable medium may be one or more of a machine-readable storage device, a machine-readable storage substrate, a memory device, a composition of matter effecting a machine-readable propagated signal, and/or medium. The terms "data processing apparatus", "computing device" and "computing processor" may encompass one or more apparatus, devices, and/or machines for processing data, including by way of example a programmable processor, a computer, multiple processors or computers, and/or other devices. The apparatus may include, in addition to hardware, code that may create an execution environment for the computer program in question, e.g., code that includes processor firmware, a protocol stack, a database management system, an operating system, or a combination of one or more of them. A propagated signal may be an artificially generated signal, e.g., a machine-generated electrical, optical, or electromagnetic signal that may be generated to encode information for transmission to suitable receiver apparatus.

A computer program (also known as an application, program, software, software application, script, or code) may be written in a form of programming language, including compiled or interpreted languages, and it may be deployed in a form, including as a stand-alone program or as a module, component, subroutine, or other unit suitable for use in a computing environment. A computer program may not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may be performed by, and apparatus may also be implemented as, special purpose logic circuitry, e.g., an FPGA (field programmable gate array) and/or an ASIC (application specific integrated circuit).

Processors configured for execution of a computer program may include, by way of example, one or more of microprocessors, one or more processors of a digital computer, and/or other processors. A processor may receive instructions and/or data from one or more of a read only memory, a random access memory, and/or other sources. The components of a computer may include one or more of a processor for performing instructions, one or more memory devices for storing instructions, and/or other components. A computer may further include, or be operatively coupled to receive data from or transfer data to, one or more mass storage devices for storing data, e.g., magnetic, magneto optical disks, or optical disks, and/or other components. A computer may be embedded in another device, e.g., one or more of a mobile telephone, a personal digital assistant (PDA), a mobile audio player, a Global Positioning System (GPS) receiver, and/or other devices. Computer readable media suitable for storing computer program instructions may include one or more forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure can be implemented on a computer having one or more of a display device for displaying information, one or more input devices, and/or other components. The display device may include one or more of an LCD (liquid crystal display) monitor, a touch screen, and/or other devices. The one or more input devices may include one or more of a keyboard, a pointing device, and/or other devices. The pointing device may include one or more of a mouse, a trackball, and/or other devices. The one or more input devices may allow a user to provide input to the computer. Other kinds of devices may be used to provide interaction with a user as well; for example, feedback provided to the user can be any form of sensory feedback, e.g., one or more of visual feedback, auditory feedback, tactile feedback, and/or other feedback; and input from the user can be received in a form, including one or more of acoustic, speech, tactile input, and/or other input. A computer may interact with a user by sending documents to and receiving documents from a device that may be used by the user. For example, the computer may be configured to send web pages to a web browser on a user's client device in response to requests received from the web browser.

One or more aspects of the disclosure may be implemented in a computing system that includes one or more of a backend component, a middleware component, a frontend component, and/or other components. The backend component may include a data server, and/or other components. The middleware component may include an application server and/or other components. The frontend component may include a client computer and/or other components. The client computer may have a graphical user interface or a Web browser through which a user may interact with an implementation of the subject matter described herein. The computing system may include a combination of one or more of the backend component, the middleware component, the frontend component, and/or other components. The components of the computing system may be interconnected by a form or medium of digital data communication, e.g., a communication network. Examples of communication networks may include one or more of a local area network ("LAN"), a wide area network ("WAN"), an inter-network (e.g., the Internet), peer-to-peer networks (e.g., ad hoc peer-to-peer networks), and/or other communication networks.

In some implementations, the computing system may include clients and/or servers. A client and server may be generally remote from each other and may interact through a communication network. The relationship of client and server arises by virtue of computer programs running on the respective computers and having a client-server relationship to one another. In some implementations, a server may transmit data (e.g., an HTML page) to a client device (e.g., for purposes of displaying data to and receiving user input from a user interacting with the client device). Data generated at the client device (e.g., a result of the user interaction) may be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A head-mounted device comprising:
    a forehead assembly defining a forward direction, the forehead assembly comprising:
        a forehead body having a first side portion, a second side portion, wherein individual ones of the first side portion and the second side portion include an upper portion, and a lower portion;
        a first speaker positioned on the lower portion of the first side portion of the forehead body; and
        a second speaker positioned on the lower portion of the second side portion of the forehead body;
    a first side strap connected to the first side portion of the forehead body and including a first volume;
    a third speaker housed in the first volume;
    a second side strap connected to the second side portion of the forehead body and including a second volume;
    a fourth speaker housed in the second volume; and
    a rear-head assembly comprising:
        a buckle having a first side and a second side opposite the first side, the buckle being configured to receive and releasably attach to the first side strap and the second side strap; and
        a buckle pad disposed on the first side of the buckle,
    wherein the first side strap and the second side strap individually define an arcuate shape extending upward relative to the forehead assembly to curve around an individual ear of a user.

2. The head-mounted device of claim 1, wherein the forehead assembly further comprises one or more physical processors housed within the forehead body, the one or more physical processors being configured by machine-readable instructions to send individual audio signals to individual ones of the first speaker, the second speaker, the third speaker, and the fourth speaker.

3. The head-mounted device of claim 2, wherein the one or more physical processors further configured by machine-readable instructions to assign the individual audio signals to individual speakers, the assignment providing a surround sound effect.

4. The head-mounted device of claim 3, wherein the surround sound effect includes a 5.1-surround sound.

5. The head-mounted device of claim 1, wherein the first side strap and the second side strap individually include an arcuate shape portion configured for positioning above an individual ear of a user.

6. The head-mounted device of claim 5, wherein the first volume and the second volume are individually positioned in the individual arcuate shape portions of the first side strap and the second side strap, such that the first volume and the second volume are positioned above the respective ears of the user wearing the head-mounted device.

7. The head-mounted device of claim 1, wherein respective surfaces of the first speaker and the second speaker are arranged in a rearward direction opposite the forward direction at an angle with respect to one another.

8. The head-mounted device of claim 1, wherein the forehead assembly further comprises a visor extending in a first direction from the forehead body, the visor being configured to guide audio outputted from the first speaker and the second speaker toward ears of a user.

9. The head-mounted device of claim 1, wherein the forehead assembly further comprises:
    an optical engine housed within the forehead body; and
    a visor extending downward from the forehead body;
    wherein the optical engine is configured to provide an image or a partial image reflected or displayed on the visor.

10. The head-mounted device of claim 1, further comprising a top strap positioned between the first side strap and the second side strap and connecting the forehead assembly to the rear-head assembly.

11. The head-mounted device of claim 1, further comprising a microphone system, the microphone system comprising first, second, and third microphones disposed on the forehead body, the first microphone spaced from the second microphone by a first distance, and the second microphone spaced from the third microphone by a second distance greater than the first distance.

12. The head-mounted device of claim 1, further comprising a visor disposed on the forehead body, the visor configured to guide sound waves emitted by the first speaker and the second speaker in a rearward direction opposite of the forward direction.

13. The head-mounted device of claim 12, wherein the first speaker and the second speaker are arranged to face the rearward direction at a first angle with respect to one another and a second angle with respect to the corresponding speaker.

14. The head-mounted device of claim 1, further comprising a buckle configured to receive and releasably attach to the first strap and the second strap.

15. The head-mounted device of claim 1, wherein the first speaker and the second speaker are symmetrically arranged about a longitudinal axis of the forehead body.

16. The head-mounted device of claim 1, wherein the forehead body further includes an inner enclosure, wherein the first speaker and the second speaker are housed within the inner enclosure.

17. The head-mounted device of claim 1, further comprising a forehead support, the forehead support being configured to provide an interface between the forehead body and a user's forehead.

18. The head-mounted device of claim 1, wherein the image or the partial image reflected or displayed on the visor provides defines a virtual reality or an augmented reality environment.

19. The head-mounted device of claim 1, wherein one both of the first speaker and/or the second speaker provide a higher decibel output than one or both of the third speaker and/or the fourth speaker.

\* \* \* \* \*